United States Patent [19]

Bodolus et al.

[11] Patent Number: 4,463,137

[45] Date of Patent: Jul. 31, 1984

[54] PROCESS FOR THE PREPARATION OF RUBBER-MODIFIED THERMOPLASTIC RESINS

[75] Inventors: Christopher L. Bodolus, Cleveland; William J. Miloscia, Shaker Heights, both of Ohio

[73] Assignee: The Standard Oil Company, Cleveland, Ohio

[21] Appl. No.: 384,980

[22] Filed: Jun. 4, 1982

[51] Int. Cl.$^3$ .............................. C08F 279; C08F /04; C08F 255/02; C08F 255/06; C08F 283/06

[52] U.S. Cl. ...................................... 525/316; 525/53; 525/242; 525/289; 525/290; 525/292; 525/308; 525/315; 525/322; 525/404; 525/942

[58] Field of Search ................. 525/315, 316, 53, 942, 525/290, 322, 404

[56] References Cited

U.S. PATENT DOCUMENTS

| | | | |
|---|---|---|---|
| 3,511,895 | 5/1970 | Kydonieus et al. | 260/876 |
| 3,607,983 | 9/1971 | Rushton et al. | 525/316 |
| 3,780,139 | 12/1973 | Sutter et al. | 260/880 B |
| 3,928,495 | 12/1975 | Dalton | 260/876 R |
| 3,931,356 | 1/1976 | Dalton | 260/876 R |
| 4,053,539 | 10/1977 | Delsarte | 525/316 |
| 4,308,354 | 12/1981 | Jung et al. | 525/84 |

*Primary Examiner*—Briggs, Sr. Wilbert J.
*Attorney, Agent, or Firm*—Renner, Kenner, Grieve & Bobak

[57] ABSTRACT

A process for the impact modification of a plastic with a rubber polymer to form a thermoplastic resin in a reactor extruder is provided. The process includes the steps of dissolving a rubber polymer in a solvent selected from the group consisting of ethylenically unsaturated monomers and non-polymerizable organic compounds to form a feed solution, introducing the feed solution into the feed section of a twin screw reactor extruder, introducing a separate feed stream containing a material in sufficient amount to precipitate the rubber polymer, heating the feed solution and feed stream under pressure to a temperature sufficient for polymerization to begin, polymerizing the monomers with the rubber polymer in the reactor extruder to form a thermoplastic resin and extruding the thermoplastic resin through a die. A novel ABS thermoplastic resin is also provided having a uniform distribution of rubber particles dispersed within the plastic phase of the resin, the rubber particles ranging in size of from about 0.01 to 0.25 microns. The thermoplastic portion of resin has an acrylonitrile content of more than about 26 weight percent and can have as much as 60 weight percent.

21 Claims, 5 Drawing Figures

PROCESS FOR THE PREPARATION OF RUBBER-MODIFIED THERMOPLASTIC RESINS

TECHNICAL FIELD

The present invention provides a process for the preparation of rubber-modified thermoplastic copolymers in order to improve properties such as impact strength and tensile properties. One such resin of proven utility is the terpolymer of acrylonitrile, butadiene and styrene (ABS) and the process provided herein can produce superior ABS as compared with the products from known bulk and/or emulsion processes. ABS resins are useful in injection and compression molding applications where high impact thermoplastics are desired. The process of the present invention is conducted in a single vessel, preferably a twin screw reactor extruder. The process is applicable to the preparation of ABS resins having a high acrylonitrile content as well as a host of other rubber-modified thermoplastic resins.

BACKGROUND ART

Bulk polymerization processes are employed to prepare copolymers of rubber and plastic forming monomers, however, they require a second stage shearing step or the particle size of the rubber formed is very large and non-uniform. Emulsion processes produce a more favorable particle size and better gloss product but have the disadvantage that water is included in the process.

One way in which particle size of the rubber can be controlled without resort to an emulsion system is by employing a reactor extruder as the polymerization vessel. Reactor extruders of the twin screw design provide sufficient shearing action during polymerization of the monomers within that smaller rubber particle sizes can result.

The continuous production of copolymers from 1,3-dienes and monovinyl aromatics in an extruder is described in U.S. Pat. No. 3,780,139. The patent does not disclose, however, the formation of resin copolymers of monomers such as styrene, acrylonitrile, methylacrylate and the like grafted onto a preformed rubber.

Work with preformed rubbers in the presence of various plastic monomers which are polymerized in a reactor extruder has been set forth in a copending patent application, U.S. Ser. No. 309,718, now U.S. Pat. No. 4,410,659 commonly owned by the Assignee of record herein. A feature of that application includes dissolving a rubber in the plastic monomers prior to feeding into the extruder, coupled with the shearing action within the extruder to produce a uniform dispersion of the rubber throughout the plastic phase yielding high impact strength materials.

A process which also discloses dissolving a preformed rubber in a solution of one or more plastic forming monomers is set forth in U.S. Pat. No. 3,511,895. The patent calls for a three stage mass polymerization conducted in separate reactors having agitators for shear and mixing. The resulting polymer product has a broad and uniform distribution of molecular weight including a "tail" of a very low molecular weight material comprising 10 to 25 percent by weight.

The process provides that a solution comprising 2.5 to 19 weight percent polybutadiene in a mixture of acrylonitrile and styrene monomers be added to the first stage reactor which already contains a styrene homopolymer or acrylonitrile/styrene copolymer. Combining the two solutions causes the rubber to precipitate while the agitation within the vessel disperses the rubber before significant crosslinking can occur. Viscosity is continuously reduced and polymerization increases in each of the three reactors. The patent states that particle size of the rubber in the product is generally fixed in the second stage reactor and comprises at least about 80 percent of the particles falling within the range of 0.5 to 2.0 microns and less than about one percent being larger than six microns. The patent further states that by controlling the microgel particle size of the rubber and by providing the low molecular weight tail, physical properties and surface appearance of the product are improved.

Thus, the patents discussed herein have not disclosed a simple one stage polymerization, as can be conducted in a reactor extruder, where rubber-modified plastics can be prepared having a uniformly distributed rubber of uniform small particle size, on the order of less than 0.25 micron, in the plastic phase. While this object can be met to an extent according to the process set forth in the aforementioned Ser. No. 309,718, the present invention differs in that higher strength thermoplastics can be obtained resulting from the feeding and chemical precipitating techniques disclosed herein.

DISCLOSURE OF THE INVENTION

It is therefore an object of the present invention to provide a process for the preparation of rubber-modified thermoplastic resins in a reactor extruder, which resins have improved impact strength and tensile properties over existing resins.

It is another object of the present invention to provide a process for the preparation of rubber-modified thermoplastic resins in a reactor extruder, which resins have a smaller rubber particle and more uniform distribution thereof throughout the thermoplastic resin than resins of comparable composition produced via other techniques.

It is yet another object of the present invention to provide a process for the preparation of rubber-modified thermoplastic resins in a reactor extruder which resins can comprise a higher content of certain ethylenically unsaturated monomers than has been possible with existing emulsion or bulk processes.

It is still another object of the present invention to provide a process as set forth hereinabove wherein a preformed rubber polymer is dissolved in one or more ethylenically unsaturated monomers which solution is then polymerized within a reactor extruder along with a separate liquid feed stream containing a material to precipitate the rubber polymer.

It is yet another object of the present invention to provide a process wherein a preformed rubber polymer can be dissolved in a non-polymerizable organic solvent or non-monomer which solution is fed to a reactor extruder with one or more ethylenically unsaturated monomers which cause precipitation of the rubber polymer and subsequently polymerize.

It is yet another object of the present invention to provide a process for the preparation of high acrylonitrile ABS type resins in a reactor extruder, which resins have improved impact strength and improved tensile properties over existing resins.

It is yet another object of the present invention to provide rubber-modified thermoplastic resins having a uniform, small particle size of rubber uniformly dispersed within the plastic phase of the resin and a high content of specific ethylenically unsaturated monomers.

These and other objects, together with the advantages thereof over the prior art, which shall become apparent from the specification which follows, are accomplished by our invention as hereinafter described and claimed.

In general, the process of the present invention includes the steps of dissolving a rubber polymer in a solvent selected from the group consisting of ethylenically unsaturated monomers and non-polymerizable organic compounds to form a feed solution, introducing the feed solution into the feed section of a twin screw reactor extruder, introducing into the feed section a separate liquid feed stream containing a material in sufficient amount to precipitate the rubber polymer, heating the feed solution and feed stream under pressure to a temperature sufficient for polymerization to begin, polymerizing the monomers around the precipitated rubber polymer in the reactor extruder to form a thermoplastic resin and extruding the thermoplastic resin through a die.

Another process for the preparation of rubber-modified thermoplastic resins in a reactor extruder has been provided and includes the steps of dissolving a rubber polymer in a solvent selected from the group consisting of ethylenically unsaturated monomers and non-polymerizable organic compounds to form a feed solution, introducing the feed solution into the feed section of a twin screw reactor extruder, introducing into the feed section a separate liquid feed stream containing a material in sufficient amount to precipitate the rubber polymer and form a dispersion thereof in the feed solution and separate feed stream, heating the feed solution, feed stream and precipitated rubber under pressure to a temperature sufficient for polymerization of the monomers to begin, shearing the feed solution and feed stream to maintain the dispersion of precipitated rubber, thereafter reacting the dispersion of precipitated rubber, feed solution and feed stream until at least about 70 weight percent of the monomers have been converted to a thermoplastic resin, and extruding the thermoplastic resin through a die.

The rubber-modified thermoplastic resins formed according to the process of the present invention are also deemed to be novel and are characterized by having a uniform, small particle size of rubber uniformly dispersed within the plastic phase of the resin and, in some instances, a composition comprising greater percentages of a plastic such as acrylonitrile than has been possible heretofore utilizing emulsion or bulk polymerization techniques. Exemplary novel resins include ABS thermoplastics having an acrylonitrile content greater than 26 weight percent and as high as about 60 weight percent. Rubber particle size of the resins of this invention is on the order of from about 0.01 to 0.25 microns.

PREFERRED MODE FOR CARRYING OUT THE INVENTION

Polymers prepared according to the process of the present invention are polymerized within a twin screw extruder as will be discussed hereinbelow. The polymer product or resin is prepared by polymerizing a feed solution, which comprises a solution of a rubber polymer in a solvent selected from the group consisting of ethylenically unsaturated monomers and non-polymerizable organic compounds, along with a separate feed which contains a material that will precipitate the rubber polymer which material can also be an ethylenically unsaturated monomer and/or non-polymerizable organic compound.

The rubber-modified thermoplastic copolymers that can be prepared according to the process of the invention include those which are produced by polymerizing a mono-unsaturated or olefinically unsaturated nitrile, e.g., acrylonitrile, and another monovinyl monomer component copolymerizable therewith such as styrene.

More specifically, the olefinically unsaturated nitriles that can be employed in the present invention are the alpha, beta-olefinically unsaturated mononitriles having the structure:

wherein R is hydrogen, a lower alkyl group having from one to four carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monovinyl aromatic monomers are those having from about eight to 20 carbon atoms including styrene, alpha-methyl styrene, halogen substituted styrene, such as chlorostyrene and bromostyrene, the vinyl toluenes, the vinyl xylenes and the like with styrene being preferred.

As stated hereinabove, the feed solution being polymerized contains a preformed rubber polymer, preferably having a high elongation, low modulus and low glass transition temperature. Such polymers can be a homopolymer or copolymer of a conjugated diene monomer having from about four to twelve carbon atoms selected from the group consisting of butadiene-1,3, isoprene, chloroprene, bromoprene, cyanoprene, 2,3-dimethyl butadiene-1,3, 2-ethyl butadiene-1,3, 2,3-diethyl butadiene-1,3 and the like, with butadiene-1,3 and isoprene being preferred. Additionally, other rubbers can be employed such as atactic polypropylene, epichlorohydrin polyethers and ethylene-propylene-diene rubber.

The conjugated diene monomer selected for preparation of the rubber may itself be copolymerized with a comonomer selected from the group consisting of the monovinyl aromatic monomers described hereinabove such as styrene giving styrene butadiene rubber or SBR, the olefinic nitrile monomers having the structure:

such as acrylonitrile wherein R has the foregoing designation giving butadiene acrylonitrile copolymer or nitrile rubber and, an ester having the structure:

wherein $R_1$ is hydrogen, an alkyl group having from one to 30 carbon atoms, or a halogen, and $R_2$ is an alkyl group having from one to six carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like with methyl acrylate, ethyl acrylate, methyl methacrylate and ethyl methacrylate being preferred. The rubber polymer contains from 50 to 100 percent by weight of polymerized conjugated diene monomer and from zero to 50 percent by weight of a comonomer.

Where the rubber selected is not soluble in any ethylenically unsaturated monomer or at least one that is desired for the polymerization, an organic solvent for the rubber should be employed. Thus, in the instance of atactic polypropylene which is not soluble in any of the monomers disclosed herein, an inert solvent such as heptane is employed. By inert is meant the solvent does not contain unsaturation and will not polymerize. Other such solvents would include compounds such as aliphatic and aromatic ketones, oxygen and nitrogen-containing heterocyclic compounds, formamides and carbonates.

By proper selection of the monomers or inert solvents, an initially homogeneous feed solution is obtained which will provide a uniform distribution of the rubber throughout the plastic. Upon the subsequent addition of the separate feed stream which contains a material selected to precipitate the rubber from the feed solution, small and uniform rubber particles are formed which greatly benefits the properties of the thermoplastic resin product. While the polymerization in a reactor extruder of the foregoing feed solution of rubber dissolved in monomers improves properties of the thermoplastics, the present invention employs at least one additional step which permits greater concentrations of particular monomers to be employed.

As an example, ABS copolymers can be obtained by polymerizing a solution of butadiene rubber in styrene and acrylonitrile monomers. However, in order to maintain any useful amount of rubber dissolved in the monomers, the acrylonitrile content cannot exceed 35 percent. Any attempt to increase the content of acrylonitrile in the feed solution will cause the precipitation of the rubber. If precipitation in the feed solution were to occur, it could not properly be pumped to and into the reactor extruder and the distribution of rubber in the subsequently formed plastic would not be uniform. In order to avoid this occurrence, a separate feed stream of acrylonitrile is added to the reactor extruder after the feed solution has been introduced. Once inside the extruder, precipitation of the rubber is desirable so that the particles can become encapsulated within the plastic polymer being formed. Also, within the extruder intensive controlled shear provides a good suspension of the rubber.

Although a solution of the rubber in the monomers is thus desirable for practice of the present invention, there are some rubbers that are not soluble in the monomer or monomers selected or any monomers. In such an instance, the feed solution should comprise the rubber in an inert solvent and the monomers should be introduced in a separate feed stream. Thus, the step of introducing a separate feed stream of a material to precipitate the rubber polymer inside the reactor extruder provides a means for distributing the rubber throughout the plastic uniformly.

The addition of a separate feed stream of rubber precipitating compound provides several benefits. First, where a monomer is employed, the separate feed stream allows the monomer to become part of the resin composition. In some instances, even a small amount of a given monomer would cause precipitation of the rubber and hence it cannot be present in the initial feed solution. In other instances, the initial feed solution can tolerate the presence of some of a given monomer but not in amounts sufficient to provide the desired composition. Thus, a high acrylonitrile containing ABS resin can be prepared according to the present invention by use of an initial feed solution wherein butadiene rubber is dissolved in styrene and a small amount of acrylonitrile. In order to increase the content of acrylonitrile, a separate feed stream of 100 percent acrylonitrile is fed to the reactor extruder with the initial feed solution. Without the separate feed stream, acrylonitrile content of the ABS resin product will not exceed about 25 percent by weight. By employing the independent feed stream, the content of acrylonitrile in the product can easily exceed about 26 percent and can be extended to as much as about 60 percent.

With more specific reference to the preferred rubber-modified thermoplastic resins of the present invention, the composition, discussed throughout the specification, is based upon 100 parts of thermoplastic polymer or copolymer. Thus, 100 parts of the desired thermoplastic copolymer can comprise from about 40 to 74 parts of a monovinyl aromatic such as styrene and from about 26 to 60 parts of an olefinically unsaturated nitrile such as acrylonitrile. The rubber content is next given as an amount based upon the weight of the thermoplastic portion of the resin and for the preferred resin, the rubber is present in an amount of from about five to about 35 parts per 100 parts of the aforementioned thermoplastic copolymer. Of course, the rubber content can exceed 35 parts where it is desired to increase it beyond the preferred amount.

Any references in the specification or claims to the composition of the resin product should be considered in light of this explanation and thus, a resin product having up to about 60 weight percent of acrylonitrile comprises a thermoplastic copolymer having 60 percent acrylonitrile and 40 percent of a copolymer. This copolymer can then contain between about five to 35 parts of rubber based upon 100 parts of copolymer.

A second benefit of the separate feed stream is that of the rubber precipitation which provides the small, uniformly distributed rubber particles throughout the plastic matrix that improve properties of the resin. In order to cause precipitation, a compound that is incompatible with the solubility of the rubber in the feed solution is selected. This can be either a monomer or a non-monomer which functions as a rubber precipitator. An example of the latter would be an alcohol such as methanol which will cause butadiene rubber to precipitate from styrene. Thus, in order to prepare a high impact polystyrene, butadiene rubber can be distributed throughout by initial precipitation of the rubber once inside the reactor extruder. The separate feed stream may contain all alcohol for precipitation, or a mixture of alcohol with monomer, e.g., styrene.

In brief summary, the first step requires that a homogeneous, precipitate-free solution of dissolved rubber be formed which is fed to the reactor extruder. The next step requires that the dissolved rubber be precipitated in the reactor extruder which is accomplished by adding a compound which is inherently a precipitator for the rubber employed or, which is added in such an amount that precipitation occurs.

The amount of the rubber and thermoplastic monomers will be in part controlled by the solubility of the rubber and partially by the ultimate physical properties desired. In order to impart improved properties such as greater impact strength and adequate tensile strength, it is necessary that the rubber-modified thermoplastic resins have at least about five parts of rubber. An upper limit of about 50 parts is a maximum otherwise the product will be more characteristically a rubber rather than a plastic. It is to be understood that 50 parts is only an upper limit insofar as improving physical properties of the plastics are concerned and that the process of the present invention can be employed to incorporate even greater amounts of rubber.

The initial feed solution contains all of the rubber that is desired or can be dissolved in the inert solvent or thermoplastic monomer or monomers. Generally this amount will range from about five to 25 percent by weight based upon the weight of the feed solution, the remaining 75 to 95 percent comprising the rubber solvent. It is important that the feed solution be homogeneous and contain no precipitate of rubber. This condition can be physically observed to exist where the feed solution does not appear cloudy or turbid when examined.

With respect to the amount of the separate liquid feed material, this should be at least enough to cause precipitation of the rubber in the feed solution to commence. Such an amount can be determined empirically by adding a gradually increasing volume of the precipitating monomer or other compound to a known volume of the feed solution. At the point where turbidity in the feed solution is detected, precipitation of the rubber has commenced and the minimum volume is known. Greater amounts can be employed to concentrate the rubber and, in the case of a monomer, such amounts will also depend upon the amount desired in the specific rubber-modified thermoplastic resin being prepared. It is believed that for some feed solutions a quantity of separate liquid monomer or rubber precipitating monomer equal to five weight percent can be sufficient for precipitation while other rubber solutions may accommodate as much as 60 to 80 weight percent of separate liquid monomer or rubber precipitating material.

Figure 1:
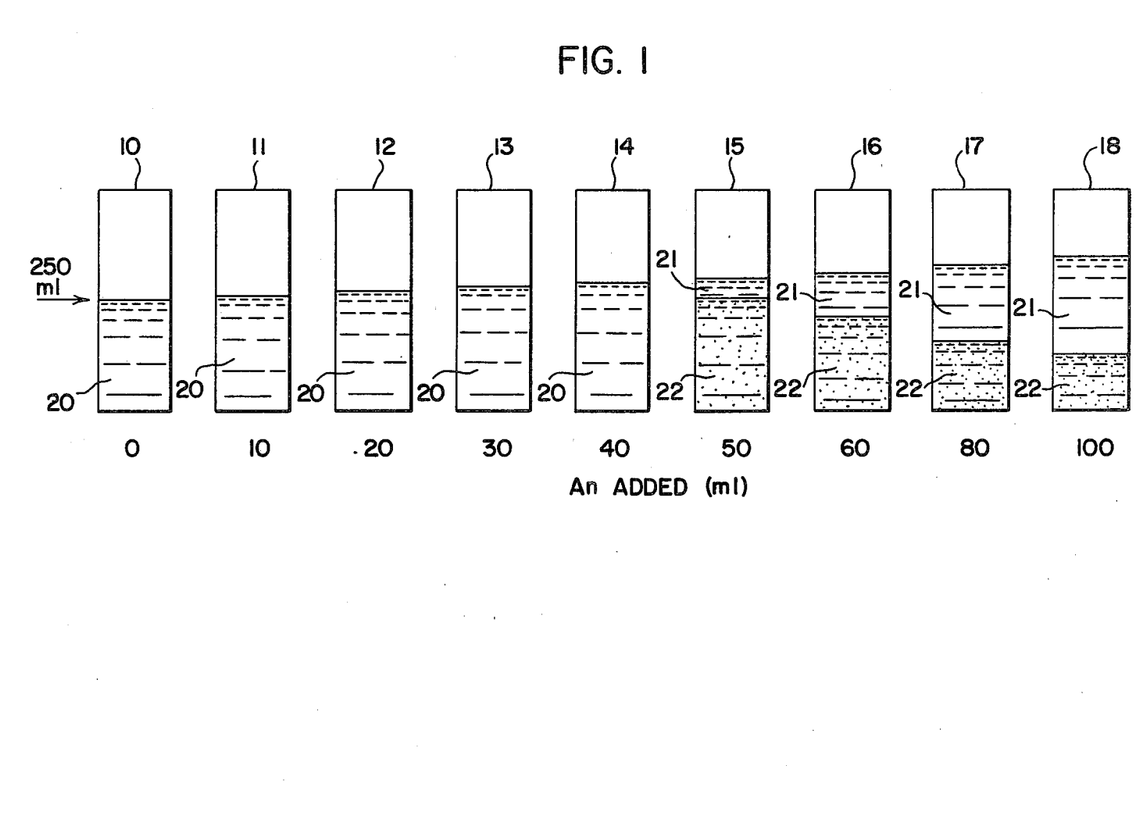
FIG. 1 is a diagramatic representation of the precipitation stages that occur when a feed solution and separate liquid feed stream according to the process of the present invention are combined.

A simple method for determining the amount of precipitating separate liquid feed material is depicted in FIG. 1 to which reference should be made. First, a series of suitable glass containers such as beakers, graduated cylinders, vials, or the like should be about half filled with a measured amount of the rubber solution initial feed. The number of containers necessary will be a function of the volume of separate material added incrementally to cause precipitation of the rubber. An actual experiment was conducted for the preparation of a high acrylonitrile containing ABS resin in nine containers as follows:

To each of nine 500 ml containers, 10-18, was added 250 ml of rubber solution feed stream comprising 15 weight percent of butadiene rubber in a 75/25 styrene/acrylonitrile comonomer solvent. Next, 10 to 20 ml aliquots of pure acrylonitrile monomer were added. Conditions were at room temperature and after each addition of monomer the solution was stirred and then examined for precipitation of rubber. Once precipitation commenced, two phases were observed and further examined.

It can be seen that container 10 had one phase, the clear phase 20 which depicts the rubber dissolved in the monomers. To container 11 was added 10 ml of acrylonitrile, bringing the total volume to 260 ml; only a clear phase 20 was observed. Similarly, containers 12, 13 and 14 received 20, 30 and 40 ml of acrylonitrile, respectively, and a clear, single phase 20 remained. However, in container 15, to which was added 50 ml of acrylonitrile, bringing the total volume to 300 ml, a precipitate of rubber was observed in the lower layer 22, above which was a small clear upper layer 21.

While a range exists between 40 and 50 ml of acrylonitrile wherein precipitation first occurs, the actual amount is usually not critical. The minimum amount of acrylonitrile in this instance that should be fed to the reactor extruder is about 50 ml. It is to be understood that in container 15 not all of the rubber has been depleted from the clear upper layer 21, nor has all of the solvent been driven from the lower precipitate layer 22.

In container 16, 60 ml of acrylonitrile were added and it can be seen that the clear upper layer 21 increased in volume. Meanwhile the lower precipitate layer 22 of rubber lost volume as it became more concentrated. To container 17, 80 ml of acrylonitrile were added and it can be seen that the clear upper layer 21 has a greater volume than the lower layer 22. Finally, to container 18, 100 ml of acrylonitrile were added, bringing the total volume to 350 ml. At this stage, the lower layer 22 occupies only one-half the starting volume of 250 ml, indicating that a 100 percent enhancement of rubber concentration has occurred.

We have found from this data that at least 50 ml of acrylonitrile should be present in the feed zone of the reactor extruder to contact 250 ml of the rubber solution, i.e., a 1:5 ratio for precipitation to occur. The preferred amount of acrylonitrile that should be added is that amount that would cause the volumes of layers 21 and 22 to be equal. From FIG. 1, it appears that approximately 70 ml of acrylonitrile would be sufficient. While greater concentration of acrylonitrile would be helpful an upper limit is approached at the stage where the volume of precipitate layer 22 has been halved. It is to be understood that the explanation of FIG. 1 is directly applicable to the use of the solution and monomers exemplified. For other rubber solutions and separate, precipitating liquid feed streams, a different ratio of liquids can be expected, and, of course, the number of containers employed and volume of aliquots added is not critical so long as observations of precipitation commencement, equal layer volumes 21 and 22 and 50 percent reduction in rubber precipitate layer 22 can be made.

Not all of the monomers become polymerized in the extruder and therefore residual amounts of unreacted compounds are removed. Conversions generally run as high as about 70 percent and yield a product comprising from five to 50 percent by weight rubber. Average molecular weights of the product can range from about 60,000 to 200,000 with 120,000 being preferred.

The polymerization of the monomers is via a bulk polymerization system for which an initiator may be employed. Suitable initiators include the azo and organic peroxide types, which are well known to those skilled in the art. These may readily be dissolved in an organic solvent and fed to the reactor extruder with the feed solution and separate feed stream.

In producing the resins from these components, other items can be added such as chain transfer agents, dyes and stabilizers. The use and amount of such items, along with the amount of initiators and crosslinking agents are all known in the art and not the subject of the present invention.

For purposes of exemplification, the process of the present invention is particularly suitable for the preparation of high acrylonitrile content ABS copolymers. High acrylonitrile ABS copolymers contain at least 26 weight percent acrylonitrile and can contain as much as about 60 weight percent. The feed solution for the preparation of the high acrylonitrile copolymer should comprise from about five to 25 percent by weight of rubber polymer, based upon the total weight of the feed solution. Polybutadiene rubber having a cis content of at least 98 percent is preferred although a range of 8.0 to 100 percent is entirely operable. Average molecular weight of the rubber polymer is from about 100,000 to about 500,000 with 300,000 being preferred. As stated hereinabove, the feed monomers make up the balance of the feed solution, ranging in amount of from about 75 to 95 percent, with 90 percent being preferred.

The monomers in the feed solution include acrylonitrile and styrene, the amount of the former being from about 10 to 30 percent and the amount of the latter being from about 70 to 90 percent with a 1:3 ratio being about the preferred maximum. Such amounts will provide for an acrylonitrile content of up to about 25 percent by weight. The addition of a separate feed stream of precipitating monomer, in this instance acrylonitrile, will raise the level of acrylonitrile in the product to that discussed hereinabove.

Regarding the reactor extruder itself, a twin screw extruder is preferred. Such extruders are known and provide mating twin screws which rotate in the same direction. Different bushings are placed on the screw shafts, which provide helical screw sections for conveying, and kneading blocks for shearing, wherein controlled polymerization is allowed to occur. The specific configuration and arrangement of conveying and kneading sections selected will depend upon a plurality of factors which relate to the product being sought. Thus, screw rotation and the pitch of the conveying sections will provide control over backpressure, throughput time and to some extent temperature. The kneading sections similarly are designed to effect control over polymerization time and temperature.

Generally speaking, the arrangement must provide for conveyance and mixing to begin at the feeding port. After a suitable temperature is reached, one or more kneading blocks are located to provide high shearing forces. When a plurality of kneading blocks are employed, which is preferred, they will be separated by conveying sections in order to move the material through the extruder. A conventional die or pelletizer head is positioned at the exit of the extruder to shape the resin for subsequent use.

Twin screw extruders of the type useful for the practice of the present invention are set forth in U.S. Pat. Nos. 3,536,680 and 3,799,234. For practice of the present invention, all of the feeds to the extruder should be liquid. Pressure in the feed section is developed by pumps which deliver the feed solution thereto. As the solution passes through the extruder and polymerization occurs, the material becomes solid. Viscous drag forces from the rotating screw create additional pressure. As is known, heat is normally added as needed by incorporating heating elements around the extruder. Similarly, heat can be controlled by suitable heating or cooling means positioned along the extruder to provide the temperatures necessary for polymerization and optimization of physical properties. As heat is generated in the reaction zones, where shearing and polymerization occur, it is usually necessary to provide suitable cooling means.

The extruder is also provided with appropriate vents for the removal of volatile, unreacted monomers or side products prior to extrusion. In systems where the reactivity ratio is low, removal and recycling of unreacted components is advantageous. A flow control valve can also be incorporated to regulate the overall pressure within the extruder. Just prior to extrusion through the pelletizer die, the heat can be adjusted to the approximate melt temperature of the resin to facilitate the formation of a smooth extrudate.

Apart from the fact that the process claimed herein employs a reactor extruder as the polymerization vessel, novelty of the present invention is not premised solely on the use of such extruders per se. The process being claimed is directed more particularly to the components being fed; the use of a liquid feed solution comprising a rubber polymer dissolved in one or more thermoplastic monomers or solvents; a separate feed stream containing a precipitating material; and, the various polymerization conditions disclosed herein. Thus, while the twin screw reactor extruder that has been employed for practice of the present invention is available from Werner and Pfleiderer, other comparable equipment could readily be substituted.

Resins such as high acrylonitrile ABS, produced in the reactor extruder are slightly different in chemical and physical properties from their emulsion produced analogs because greater amounts of acrylonitrile can be present with good generation of rubber particle size and distribution. Higher acrylonitrile content does stiffen the resin; however, much better tensile properties and impact strength also result. The resin from the reactor extruder offers better control over elastomer crosslink density and occluded phase volume than resin produced via conventional emulsion or bulk systems.

Figure 2:
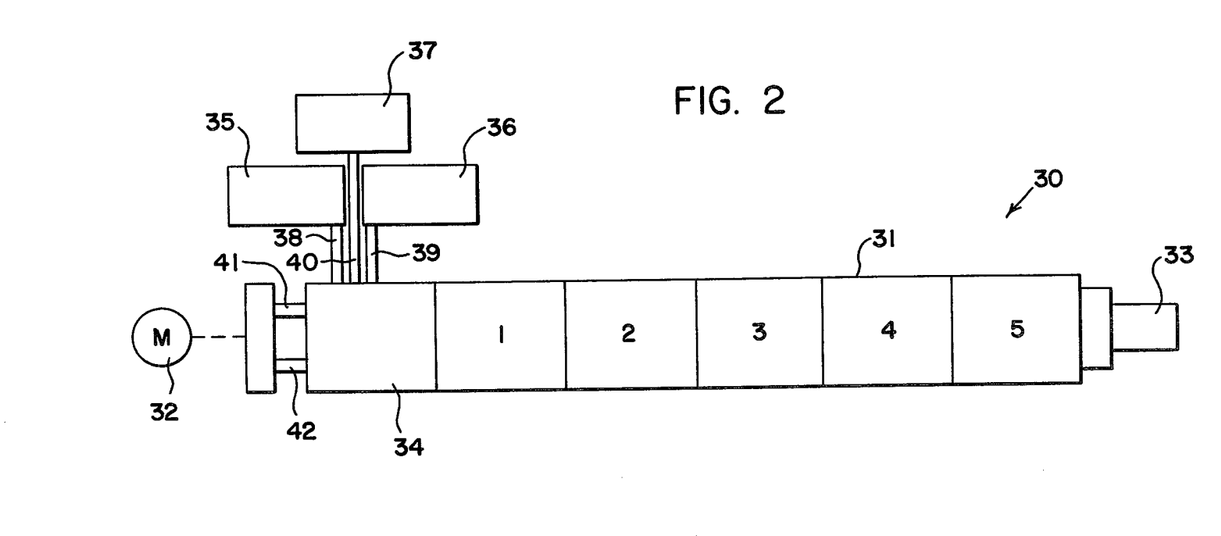
FIG. 2 is a schematic view of a twin screw reactor extruder apparatus for the preparation of rubber-modified thermoplastic resins.

To aid discussion of the polymerization conducted in the reactor extruder, reference can be made to FIG. 2 which provides a schematic representation of the extruder, indicated generally by the numeral 30. The extruder 30 includes the outer barrel 31, which can be heated and cooled via means not shown, a drive motor 32 and a pelletizer head or other suitable extrusion die 33. A feeding zone 34 is provided for the rubber containing feed solution, separate precipitating liquid material feed and initiator from independent tanks 35, 36 and 37, respectively, connected by supply lines 38, 39 and 40. Within the extruder 30 are twin screws driven by shafts 41 and 42. The screws, not shown, provide a combination of conveying and kneading action, as discussed hereinabove. Polymerization zones 1 to 5 are depicted which can be heated or cooled independently to control temperature, as indicated for the examples. Vents, not shown, can be provided as necessary to remove volatile gases or residual unreacted monomers flashed off at the die head by the hot polymer.

Polymerization zones 1 to 5 contain different arrangements of conveying sections and kneading or shearing sections as stated hereinabove. Conveying sections are usually provided in zones 1 and 5 while kneading sections will be provided in zones 2 to 4. Individual zones 2 to 4 can also contain some short conveying sections to maintain a flow of polymer as it is formed. The design or arrangement of the extruder screws does not form a part of the subject invention, inasmuch as such technology is within the skill of the art and is determined or controlled by factors such as the polymer being formed and the temperature, pressure, residence time and shear rate desired.

As stated hereinabove, the process of the present invention is practiced by dissolving a rubber polymer in one or more plastic forming monomers or inert solvents to form a solution which is thereafter fed to the reactor extruder for polymerization. In order for polymerization to begin, an initiation temperature ranging from about 20° to 100° C. should be reached in the feeding zone 34. While the desired temperature could also be obtained in zone 1 or subsequently, it is desirable that polymerization commence as soon as possible first, to form a viscous product that can be conveyed through the extruder and second, so that the polymer can be subjected to the shearing action of the kneading blocks. As will be appreciated by those skilled in the art, the use of a known initiator can result in lower initiation temperatures and/or the earlier commencement of polymerization. Also, specific initiators can be selected that will selectively migrate to the rubber phase being precipitated within the feed port of the reaction extruder.

The step of shearing occurs within the reactor extruder, specifically as the combined feed streams are subjected to the kneading blocks. It is necessary for the shearing to occur and continue to such an extent that the solids content i.e., the resin product, formed is equal to about twice the elastomer content in the feed solution so that phase inversion caused by chemical precipitation will be maintained. The occurrence of phase inversion is necessary for the formation of the resins of the present invention and it is initially triggered by the impingement of the feed solution with the separate feed stream which causes precipitation of the rubber. Initially the plastic forming monomer, or monomers, are dispersed throughout the homogeneous rubber polymer in the feed solution. As acrylonitrile or other material is fed, the solubility limit of the rubber is surpassed and a point is reached where there are present more units of plastic polymer and/or solvent of a character different from the rubber and the rubber becomes dispersed in the plastic and other solvent that may be present.

Causing the phase inversion to occur within the reactor extruder feed port by the use of a separate stream of acrylonitrile or any other liquid that will precipitate the rubber, a feature of the process herein disclosed, results in a very small and uniform rubber particle size as well as uniform dispersion within the thermoplastic matrix.

We believe that in order for the most uniform particle size and distribution of rubber particle, the shearing within the reactor extruder, to which the feed solution and polymer is subjected, must be controlled until the amount of solids present is equal to at least twice the amount of the elastomer content present in the feed solution. Thus, if the rubber content of the feed solution is equal to X, for instance 10 weight percent, then the solids content must be equal to at least 2X or 20 weight percent before shearing is complete.

The amount of shearing action can be controlled by many factors such as screw rotation, positioning of the kneading sections and residence time within the reactor extruder. Another factor is the rubber polymer content of the feed solution. If the content is high, that is, greater than 15 percent, then the shearing zone may extend beyond zone 3 in order to produce the two-fold increase in solids content. On the other hand, a lower rubber content feed solution may not require as long a shearing zone in order to avoid over shearing of the resin. Of course, control over the amount of shear in a longer shearing section can still be facilitated to an extent by adjusting temperature, pressure and throughput rate.

The extruder can operate at pressures of from about 0.69 to 6.9 MPa so long as the feed solution is forced into the feed section at a pressure at least equal to the vapor pressure of the monomers at the maximum zone temperature being employed. If the pressure is lower, monomer gases will form which do not polymerize. Above this minimum pressure value, there is an optimum pressure range that exists but only when all other variables are held constant.

In general, reaction rate increases as pressure increases. Reaction rate increases with higher pressure because the higher pressure insures that liquid monomers are forced into the voids created by previously reacted monomers, so additional reaction can take place. Best operation can be achieved when the overall machine pressure is maintained above the vapor pressure of the monomers, preventing the formation of internal vapor spaces. In general, the monomers employed herein react to polymers with a higher density than the starting monomers. There also exists an upper limit for process feed pressure. If the feed pressure is above the plastic viscous drag forces, the plastic will be pushed or forced out of the reaction/shear zone before the optimum plastic has formed, that is, one having optimum viscosity, elastomer level and elastomer crosslinking level.

With respect to temperature, the rate of reaction increases with increasing temperature. When all other variables are held constant, in particular the length and location of the shear zone, an optimum temperature range exists that reacts feed solution to a plastic in the shear zone at an optimum elastomer level. If the temperature is too high, elastomer crosslinking level may be too high causing the molecular weight of the rubber and resin product to suffer as well as a lowering of resin impact strength. If the temperature is too low, the plastic may have passed through the shear zone without having reacted to the optimum solids level for shear forces to form the proper elastomer particle size. Temperatures can generally range from about 80° C. to as high as the melt temperature of the resin formed e.g., 177° to about 191° C.

Residence time within the reactor is a factor particularly applicable to the reaction/shear zones. It is approximately equal to the total volumetric void space of the reaction/shear zones, divided by the volumetric feed solution rate to the reactor extruder. With all other variables held constant, it is indirectly proportional to the feed solution rate. There is an optimum residence time range for any given set of variables. Too high of a feed rate could result in too short of a residence time to allow for the optimum plastic reaction to have been reached in the shear zone. Too low of a feed rate could result in too long of a residence time such that the plastic became "over reacted" or "over sheared" in the shear zone.

With respect to shear, even though a plastic is being formed in the shear zone with the optimum viscosity and elastomer level, if the optimum shear forces are not applied, the elastomer particles will not be maintained at the proper size. Shear forces are generally varied by varying screw configuration and/or screw RPM. If all variables are held constant, including screw configuration, shear is directly proportional to screw RPM. Too little or too much shear can result in an undesirable too large or too small elastomer particle size. It is believed that a Shear Rate ranging between about 50 to 300 sec$^{-1}$ will provide the necessary shearing action to maintain the suspension of precipitated rubber. Similarly, the desired size of the elastomer particles for the resins set forth herein should range from about 0.01 to 0.25 microns.

Lastly, although not a novel step per se, properties of the resins prepared by the process of the present invention can be modified by the selection of proper crosslinking catalysts in the initiator feed stream. If, for example, the system is constrained to a certain temperature such as due to concern for thermal stability of the plastic components, peroxides can be used to insure that the elastomer becomes sufficiently cured while polymerization is taking place.

In the work which is reported hereinbelow, three reactor extruder resins have been produced and characterized. Properties measured and reported for two of the resins include molecular weight, rubber content, impact strength, tensile measurements, melt flow rheological properties, heat distortion temperature (HDT) and hardness. In each instance of preparation, the feed solution, comprising the rubber polymer polybutadiene dissolved in the plastic forming monomers is fed to the feed zone of the reactor extruder. Respective amounts of each component are specified for Resins 1 and 2 with reaction times, temperatures, monomer feed rates and RPM of the extruder screws. Initiator/crosslinker stream composition and flow rate are also indicated.

Preparation of Rubber-Modified Resins

The first two resins reported hereinbelow are high acrylonitrile content ABS resins which were prepared using styrene (S), acrylonitrile (An), and polybutadiene rubber (BR). Polybutadiene utilized was Taktene 502, the properties of which, as well as Taktene 1202, are set forth in Table I hereinbelow. All parts are presented on a weight percent basis. The polymerizations were initiated in part with peroxides and thermally aided with heat. A third resin was also prepared wherein the rubber feed solution comprised Taktene 502 dissolved in styrene and the independent feed stream comprised a mixture of styrene and methanol, the latter being employed to precipitate the rubber.

The resins discussed hereinbelow were analyzed and are reported in Tables II to IV which follow. Table II provides composition and molecular weights of the three resins and Tables III and IV provide resin properties for Resins 1 and 2.

TABLE I

Characterizing Properties of the Taktene 1202 and Taktene 502 Samples

| Rubber Identification | Taktene 1202 Lot 14 | Taktene 1202 Lot 863 | Taktene 502 Lot 13 |
|---|---|---|---|
| Bulk Polymer Properties | | | |
| Mooney Viscosity (ML$_{1+4}$ at 100° C.) | 41.0 | 39.0 | 28.0 |
| Ash (Wt %) | 0.08 | 0.10 | 0.08 |
| Volatiles (wt %) | 0.24 | 0.26 | 0.20 |
| Stabilizer$^a$ (wt % by addition) | 0.6 | 0.6 | 0.6 |
| Solution Properties (as a 5 w/w % solution in styrene monomer) | | | |
| Fluid Viscosity (mPa.s.) | 78.9 | 60.0 | 35.5 |
| APHA Color | 7.5 | 7.5 | 7.5 |

$^a$Stabilizer System comprises Irganox 1076 - 0.15 wt % Polygard HR - 0.45 wt %

| | Resins 1-2 |
|---|---|
| Rubber feed solution: | 74.06% S, 25.94% An, 10.85% Taktene 502 |
| Independent feed solution: | 100% An |
| Temperature: | 163° C. zones 1 to 5, die 177° C. |
| No. 1: | |
| Feed rate: | Rubber feed solution 25 cc/min |
| | Pure Acrylonitrile 10 cc/min |
| | Initiator 0.5 cc/min composed of 25 wt % Di Cup plus 50 wt % Polygard |
| Operating Pressure: | 1.38 to 1.55 MPa at the feed port |
| Product rate: | 17.5 grams/min |
| No. 2: | |
| Feed rate: | Rubber feed solution 22 cc/min |
| | Pure Acrylonitrile 10 cc/min |
| | Initiator 0.7 cc/min composed of 25 wt % Di Cup plus 50 wt % Polygard |
| Operating Pressure: | 1.24 to 1.38 MPa at the feed port |
| Product rate: | 17.5 grams/min |
| | Resin 3 |
| Rubber feed solution: | 100% S with 15.0 wt % Taktene 502 |
| Independent feed solution: | 50/50 wt % mixture of methanol and S |
| Temperature: | 187.8° C. Zones 1 to 5, die 187.8° C. |
| No. 3: | |
| Feed rate: | Rubber feed solution 27 cc/min |
| | Methanol/Styrene feed 11 cc/min |
| | Initiator 0.6 cc/min composed of 10 wt % Di Cup in toluene |
| Operating Pressure: | 2.07 MPa at the feed port |
| Product rate: | 21.7 grams/min |

TABLE II

Resin Characteristics

| Resin No. | Composition S$^a$ (wt %) | Composition An$^a$ (wt %) | BR$^b$ (wt %) | Residual Monomers S (ppm) | Residual Monomers An (ppm) | Molecular Weight Mn 10$^3$ | Molecular Weight Mw 10$^3$ |
|---|---|---|---|---|---|---|---|
| 1 | 61.63 | 38.37 | 20.77 | 8665 | 3310 | 32.10 | 103.0 |
| 2 | 60.87 | 39.14 | 19.55 | 9690 | 3490 | 41.80 | 128.4 |
| 3 | 100.0 | — | 25.6 | N/A | N/A | 15.8 | 42.1 |

$^a$Composition of the thermoplastic matrix component
$^b$Total weight percent of rubber contained within the resin product

TABLE III

Resin Properties

| Resin No. | Notched Izod kJ/m | Hardness (RWR) | Heat Distortion Temp. (°C.) | Brabender Torque (M-grams) | Melt Flow Index (grams/10 min) |
|---|---|---|---|---|---|
| 1 | 0.335 | 105 | 85 | 970 | 1.03 |
| 2 | 0.304 | 101.5 | 87 | 1210 | 1.63 |

TABLE IV

Resin Tensile Properties

| Resin No. | Flex Strength MPa | Flex Modulus GPa | Elong. at Yield % | Elong. at Break % | Tensile Modulus GPa | Yield Strength MPa | Break Strength MPa |
|---|---|---|---|---|---|---|---|
| 1 | 61.75 | 1.91 | 3.2 | 48.0 | 1.93 | 35.88 | 24.52 |
| 2 | 64.17 | 1.94 | 4.1 | 31.0 | 1.80 | 36.57 | 37.12 |

Figure 3:
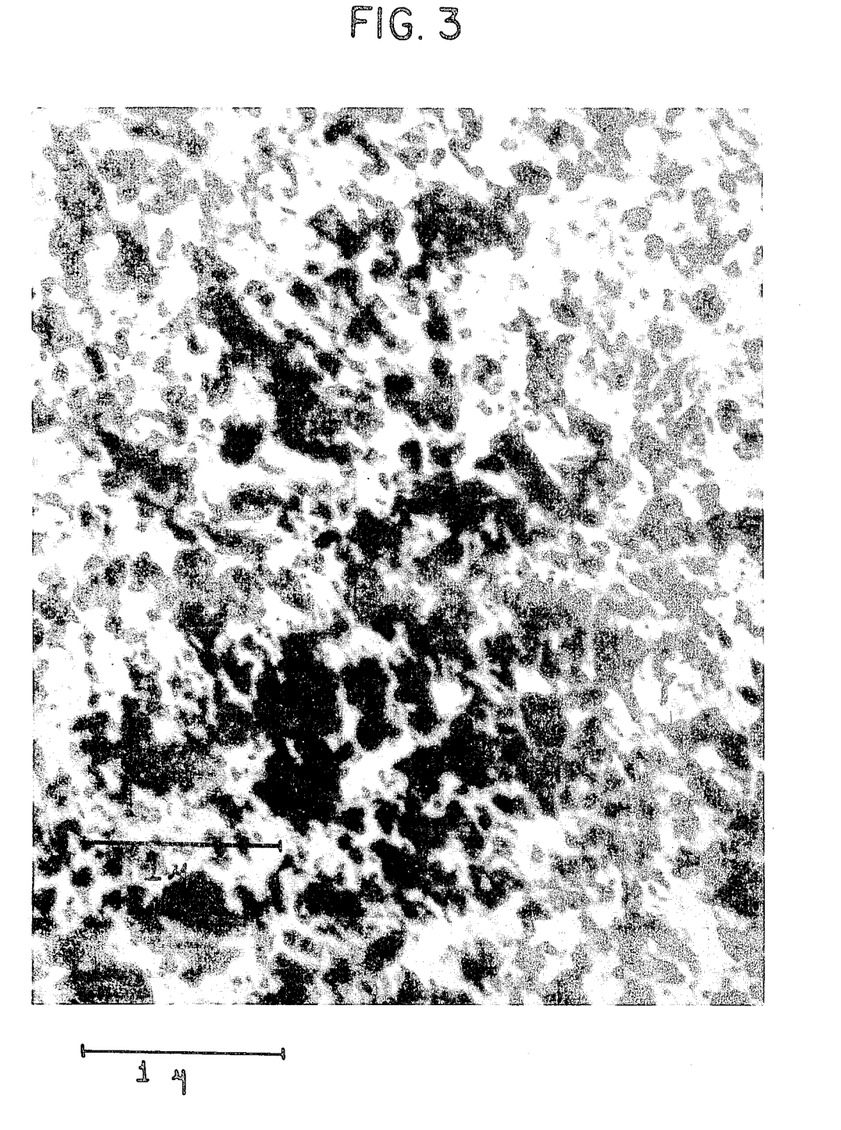
FIG. 3 is a transmission electron photomicrograph of a high acrylonitrile containing ABS resin produced according to the process of the present invention.

As can noted from studying Tables III and IV, the physical properties of Resins 1 and 2 are very good, particularly impact strength. The transmission electron photomicrographs of Resins 1 and 2 produced according to the process of the present invention are quite similar, one of which appears in FIG. 3. The dark regions in the photograph are the rubber phase which have a uniform average size of about 0.01 to 0.25 microns and it can be noted that the distribution thereof is highly uniform.

Figure 4:
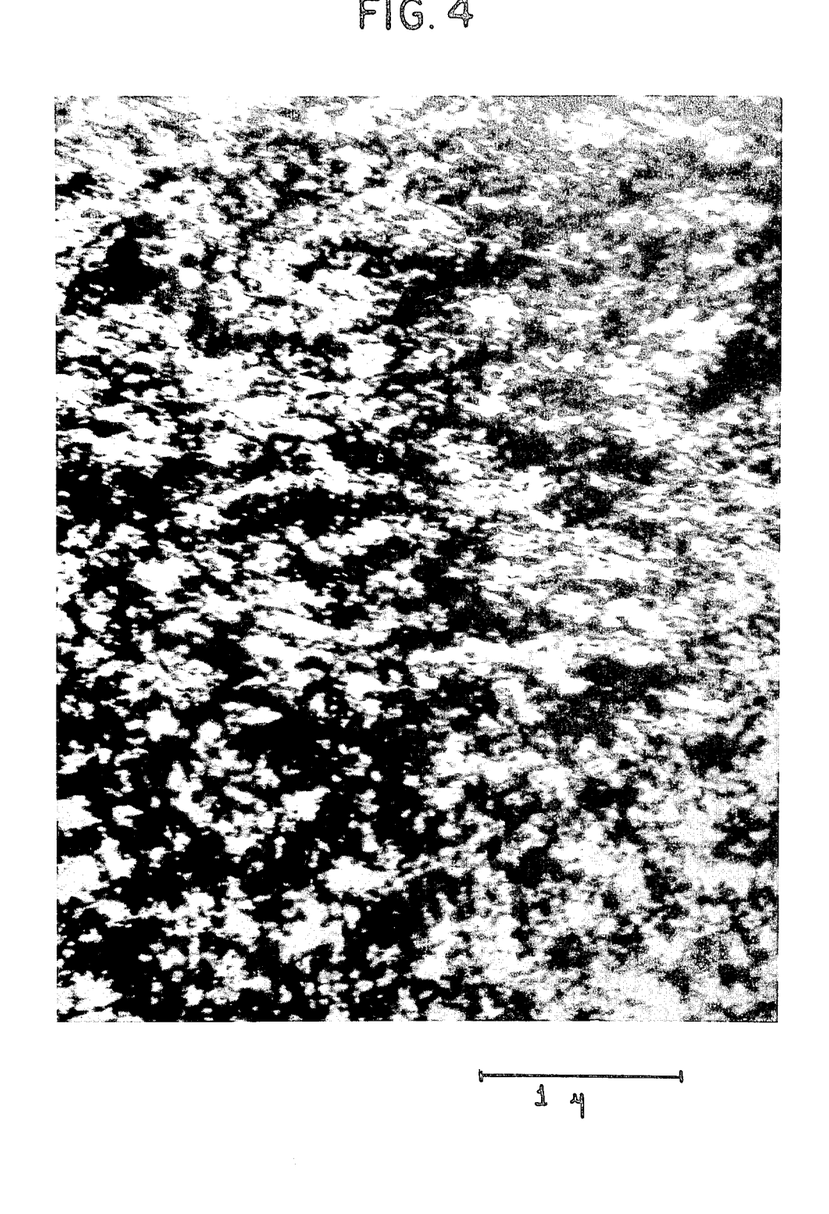
FIG. 4 is a transmission electron photomicrograph of a rubber-modified polystyrene resin produced according to the process of the present invention.
Figure 5:
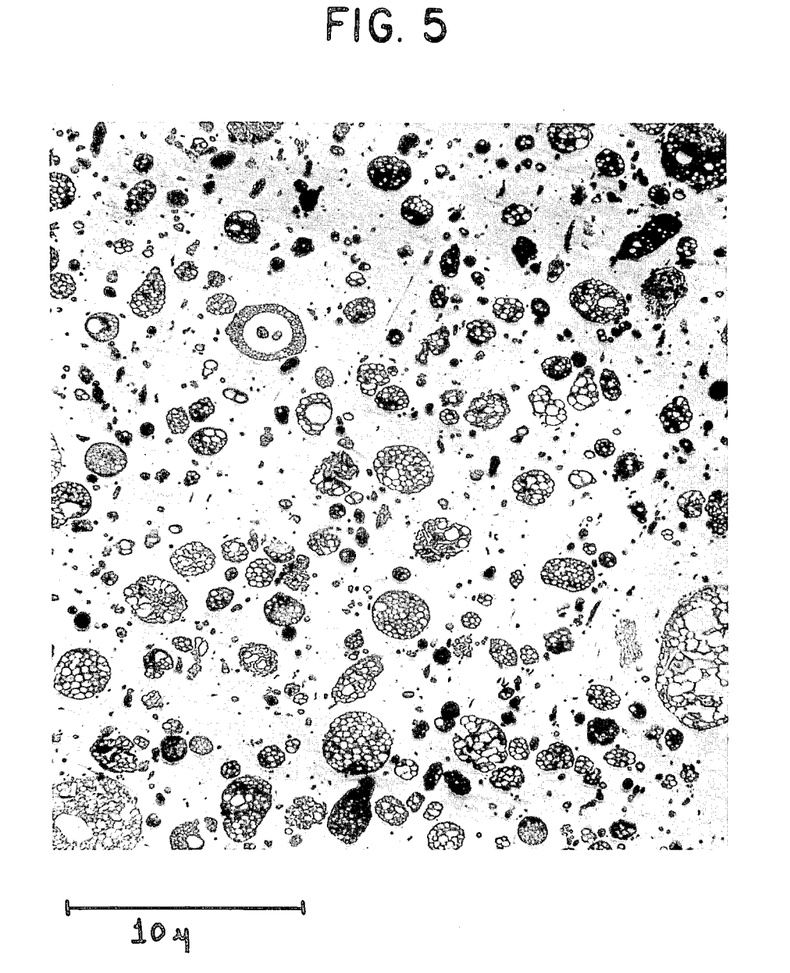
FIG. 5 is a transmission electron photomicrograph of a commercially available bulk process rubber-modified or high impact polystyrene for purposes of comparison with the microstructure depicted in FIG. 4.

Preparation of Resin 3 was an attempt to demonstrate phase precipitation in a system containing only one polymerizable component. Unfortunately, the slower kinetics of the polystyrene formation necessitated the use of elevated process temperatures in order to yield a product rate equivalent to those obtained with Resins 1 and 2. A consequence of the higher temperatures and residence times employed was an extremely low product molecular weight. Although the low molecular weight precluded obtaining realistic physical properties, the microstructure shown in FIG. 4 illustrates that the same type of rubber particles are produced as with the addition of pure acrylonitrile as a precipitating material for Resins 1 and 2. A photomicrograph of a commercially available bulk produced rubber-modified polystyrene appears in FIG. 5 and although the magnification is significantly lower, it can readily be noted that the sizes of rubber particle are larger and greatly varied and that the distribution thereof is random and uneven. It is therefore evident that rubber precipitation occurring within the reactor extruder is a physical process for fixing rubber particle size and distribution independent of subsequent polymerization chemistry that may take place.

The tensile properties, HDT and Brabender Torque of the high acrylonitrile containing resins, 1 and 2, are somewhat higher than normal ABS (75 wt % S/25 wt % An) while the melt index is lower than most typical ABS resins. These trends are expected as the acrylonitrile level is raised and the resin takes on the properties normally found in other high acrylonitrile type plastics. Perhaps the most significant feature of the high acrylonitrile containing ABS is the strong Notched Izod at a relatively low rubber content, i.e., about 20 wt % polybutadiene. From this it is evident that the less expensive acrylonitrile can be substituted for the more expensive elastomer component while still maintaining a high Notched Izod and improved tensile properties.

In conclusion, it is to be understood that practice of the process of the present invention should not be limited to a particular reactor extruder so long as the necessary shear is provided while the polymer resin is forming. Likewise, so long as a feed solution is employed comprising a rubber polymer in a non-polymerizable solvent or ethylenically unsaturated monomer or mixture thereof and, an independent liquid feed of a material that will precipitate the rubber from the solution is fed to the reactor extruder, selection of the various solvent and precipitating materials and rubber polymers can be made based upon the type of thermoplastic resin sought. Moreover, it is believed that the use of particular components as well as the amounts thereof can be made depending upon the resin properties desired. Similarly, control over the process regarding temperature, pressure, throughput rate, residence time, Shear Rate and the like can be varied as desired depending upon the reactor extruder employed and the resin to be prepared.

Thus, it can be seen that the disclosed invention carries out the objects set forth hereinabove. It is believed that the variables disclosed herein can readily be determined and controlled without departing from the spirit of the invention herein disclosed and described. Moreover, the scope of the invention shall include all modifications and variations that fall within the scope of the attached claims.

We claim:

1. A process for the preparation of high acrylonitrile resins in a reactor extruder comprising the sequential steps of:
    dissolving a rubber polymer in a solvent selected from the group consisting of ethylenically unsaturated monomers and non-polymerizable organic compounds to form a feed solution;
    introducing said feed solution into the feed section of a twin screw reactor extruder;
    introducing into said feed section a separate liquid feed stream containing a material in sufficient amount to precipitate said rubber polymer, with the proviso that acrylonitrile be provided in at least one step as said ethylenically unsaturated momomer or said material to precipitate said rubber polymer;
    heating said feed solution and feed stream under pressure to a temperature sufficient for polymerization to begin;

polymerizing said monomers around said rubber polymer in said reactor extruder to form a thermoplastic resin; and, extruding said thermoplastic resin through a die.

2. A process for the preparation of high acrylonitrile resins in a reactor extruder comprising the sequential steps of:

dissolving a rubber polymer in a solvent selected from the group consisting of ethylenically unsaturated monomers and non-polymerizable organic compounds to form a feed solution;

introducing said feed solution into the feed section of a twin screw reactor extruder;

introducing into said feed section a separate liquid feed stream containing a material in sufficient amount to precipitate said rubber polymer and form a dispersion thereof in the feed solution and separate feed stream, with the proviso that acrylonitrile be provided in at least one step as said ethylenically unsaturated monomer or said material to precipitate said rubber polymer;

heating said feed solution, feed stream and precipitated rubber under pressure to a temperature sufficient for polymerization to begin;

shearing said feed solution and feed stream to maintain said dispersion of precipitated rubber;

thereafter reacting said dispersion of precipitated rubber, feed solution and feed stream until at least about 70 weight percent of said feed solution has been converted to a thermoplastic resin; and extruding said thermoplastic resin through a die.

3. The process of claims 1 or 2, wherein the rubber polymer is selected from the group consisting of conjugated diene homopolymers having from four to about 12 carbon atoms, copolymers thereof with monovinyl aromatic monomers having from eight to about 20 carbon atoms, olefinic nitrile monomers having the structure wherein R is hydrogen, a lower alkyl group having from one to four carbon atoms or a halogen, esters of olefinically unsaturated carboxylic acids having the structure wherein $R_1$ is hydrogen, an alkyl group having from 1 to 30 carbon atoms, or a halogen, and $R_2$ is an alkyl group having from one to six carbon atoms;

atactic polypropylene;
epichlorohydrin polyethers; and
ethylene-propylene-diene rubber.

4. The process of claim 3, wherein said ethylenically unsaturated monomer is selected from the group consisting of olefinically unsaturated nitriles having the structure wherein R is hydrogen, a lower alkyl group having from one to four carbon atoms or a halogen;

monovinyl aromatic compounds having from eight to about 20 carbon atoms; and mixtures thereof.

5. The process of claim 4, wherein said feed solution comprises:

butadiene rubber as said rubber polymer;
acrylonitrile as said olefinically unsaturated nitrile;
styrene as said monovinyl aromatic compound; and
wherein said material to precipitate said rubber polymer is acrylonitrile.

6. The process of claims 1 or 2, wherein said step of heating said feed solution and feed stream is conducted in said feed section at a temperature of from about 20° C. to 100° C. and under a pressure of from about 0.69 to 6.9 MPa.

7. The process of claim 1, wherein said polymerizing step is conducted at a temperature of from 50° C. to 200° C. and under a pressure of from about 0.69 to 6.9 MPa.

8. The process of claim 2, wherein said shearing and reacting steps are conducted at a temperature of from 50° C. to 200° C. and under a pressure of from about 0.69 to 6.9 MPa.

9. The process of claim 2, wherein said shearing step imparts a Shear Rate of from about 50 to 300 sec$^{-1}$.

10. The process of claim 2, wherein the time for said shearing and reacting steps ranges from about two to about 20 minutes.

11. The process of claim 1, wherein the time for said polymerizing step ranges from about two to about 20 minutes.

12. The process of claims 1 or 2, wherein said reactor extruder has twin, co-rotating screws.

13. A process for the preparation of rubber modified thermoplastic resins in a reactor extruder comprising the sequential steps of:

dissolving a rubber polymer in a solvent selected from the group consisting of ethylenically unsaturated monomers and optionally a non-polymerizable organic compound to form a feed solution;

introducing said feed solution into the feed section of a twin screw reactor extruder;

introducing into said feed section a separate liquid feed stream containing a material in sufficient amount to precipitate said rubber polymer;

heating said feed solution and feed stream under pressure to a temperature sufficient for polymerization to begin;

polymerizing said ethylenically unsaturated monomers around said rubber polymer in said reactor extruder to form a thermoplastic resin; and, extruding said thermoplastic resin through a die.

14. The process of claim 13, wherein the composition of said feed solution comprises from about five to 25 weight percent rubber polymer.

15. The process of claim 13, wherein the rubber polymer is selected from the group consisting of conjugated diene homopolymers having from four to about 12 carbon atoms, copolymers thereof with monovinyl aromatic monomers having from eight to about 20 carbon atoms, olefinic nitrile monomers having the structure wherein R is hydrogen, a lower alkyl group having from one to four carbon atoms or a halogen, esters of olefinically unsaturated carboxylic acids having the structure wherein $R_1$ is hydrogen, an alkyl group having from 1 to 30 carbon atoms, or a halogen, and $R_2$ is an alkyl group having from one to six carbon atoms;

atactic polypropylene;

epichlorohydrin polyethers; and ethylene-propylene-diene rubber.

16. The process of claim 15, wherein said ethylenically unsaturated monomer is selected from the group consisting of monovinyl aromatic compounds having from eight to about 20 carbon atoms.

17. The process of claim 16 wherein said feed solution comprises:

butadiene rubber as said rubber polymer and styrene as said monovinyl aromatic compound; and wherein said material to precipitate said rubber polymer is methanol.

18. The process of claim 13, wherein said step of heating said feed solution and feed stream is conducted in said feed section at a temperature of from about 20° C. to 100° C. and under a pressure of from about 0.69 to 6.9 MPa.

19. The process of claim 13, wherein said polymerizing step is conducted at a temperature of from 50° C. to 200° C. and under a pressure of from about 0.69 to 6.9 MPa.

20. The process of claim 13, wherein the time for said polymerizing step ranges from about two to about 20 minutes.

21. The process of claim 13, wherein said reactor extruder has twin, co-rotating screws.

* * * * *